United States Patent
Klein et al.

(10) Patent No.: US 9,464,246 B2
(45) Date of Patent: Oct. 11, 2016

(54) METHOD AND SYSTEM FOR PURIFYING SYNTHESIS GAS, IN PARTICULAR FOR AMMONIA SYNTHESIS

(71) Applicant: LINDE AKTIENGESELLSCHAFT, Munich (DE)

(72) Inventors: Bernd Klein, Munich (DE); Albrecht Heinzel, Munich (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 5 days.

(21) Appl. No.: 14/414,177

(22) PCT Filed: Jul. 4, 2013

(86) PCT No.: PCT/EP2013/001974
§ 371 (c)(1),
(2) Date: Jan. 12, 2015

(87) PCT Pub. No.: WO2014/008996
PCT Pub. Date: Jan. 16, 2014

(65) Prior Publication Data
US 2015/0175916 A1 Jun. 25, 2015

(30) Foreign Application Priority Data
Jul. 12, 2012 (DE) .................. 10 2012 013 816

(51) Int. Cl.
| | |
|---|---|
| *C10K 1/00* | (2006.01) |
| *C01B 3/02* | (2006.01) |
| *C01B 3/56* | (2006.01) |
| *C10K 3/04* | (2006.01) |
| *C10J 3/02* | (2006.01) |
| *C10J 3/20* | (2006.01) |

(52) U.S. Cl.
CPC ............. *C10K 1/003* (2013.01); *C01B 3/025* (2013.01); *C01B 3/56* (2013.01); *C10J 3/02* (2013.01);
(Continued)

(58) Field of Classification Search
USPC ......................................... 423/650
See application file for complete search history.

(56) References Cited

U.S. PATENT DOCUMENTS 4,414,191 A  11/1983 Fuderer
8,257,452 B2  9/2012 Menzel
(Continued)

FOREIGN PATENT DOCUMENTS

DE  102004062687 A1  6/2006

OTHER PUBLICATIONS

International Search Report dated Dec. 20, 2013 issued in corresponding PCT/EP2013/001974 application (pp. 1-3).
Max Appl: "Ammonia, 3. Production Plants", Ullmann's Encyclopedia of Industrial Chemistry, Wiley-VCH Verlag GmbH & Co. KGAA, Weinheim, Germany (Oct. 15, 2011) pp. 228-261.

*Primary Examiner* — Melvin C Mayes
(74) *Attorney, Agent, or Firm* — Millen, White, Zelano, Branigan, P.C.

(57) ABSTRACT

The invention relates to a method for purifying synthesis gas, in particular for ammonia synthesis, wherein a partial stream (26) of an $H_2$-rich, CO-containing synthesis gas stream is burned, in particular to generate electrical energy, and wherein at least one component contained in the remaining $H_2$-rich, CO-containing synthesis gas stream (26a), in particular in the form of carbon dioxide, methanol and/or water, is absorbed by an adsorber at low temperatures, after which said absorbed component is desorbed from the adsorber by flushing using nitrogen (33) at higher temperatures. According to the invention the $H_2$-rich partial stream (26) is diluted using the nitrogen (35) used for the flushing before being burned. The invention further relates to a system (1) for purifying synthesis gas, in particular for ammonia synthesis.

19 Claims, 1 Drawing Sheet

(52) U.S. Cl.
CPC .. *C10J 3/20* (2013.01); *C10K 3/04* (2013.01); *C01B 2203/0283* (2013.01); *C01B 2203/042* (2013.01); *C01B 2203/043* (2013.01); *C01B 2203/046* (2013.01); *C01B 2203/047* (2013.01); *C01B 2203/048* (2013.01); *C01B 2203/0415* (2013.01); *C01B 2203/0475* (2013.01); *C01B 2203/068* (2013.01); *C01B 2203/84* (2013.01); *C10J 2200/15* (2013.01); *C10J 2300/0959* (2013.01); *C10J 2300/1606* (2013.01); *C10J 2300/1612* (2013.01); *C10J 2300/1618* (2013.01); *C10J 2300/1846* (2013.01)

(56) References Cited

U.S. PATENT DOCUMENTS

2008/0134686 A1* 6/2008 Menzel .................... C01B 3/48
 60/783
2009/0288557 A1 11/2009 Carati et al.

* cited by examiner

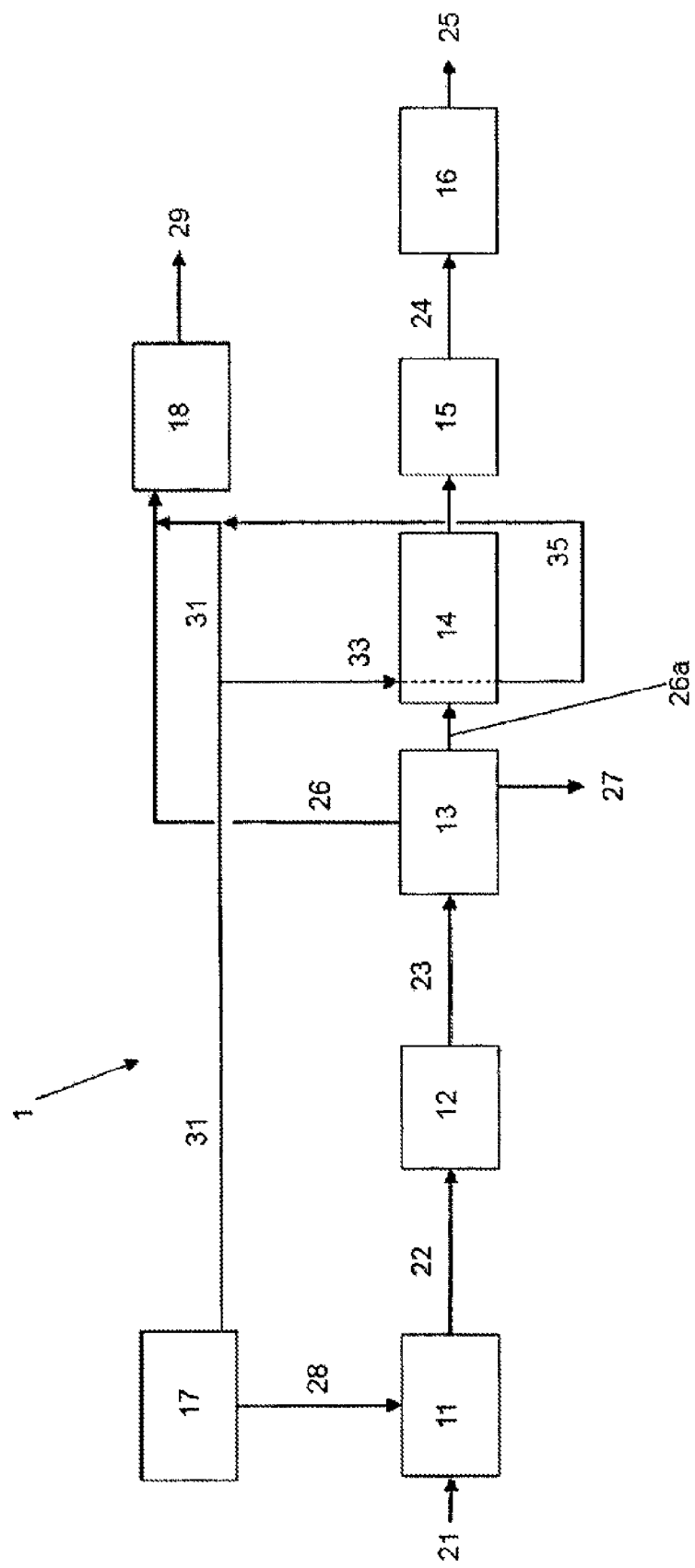

METHOD AND SYSTEM FOR PURIFYING SYNTHESIS GAS, IN PARTICULAR FOR AMMONIA SYNTHESIS

The invention relates to a method for purifying synthesis gases, in particular for ammonia synthesis, wherein a partial stream of an $H_2$-rich, CO-containing synthesis gas stream is combusted, and at least one component contained in the remaining H2-rich, CO-containing synthesis gas stream is adsorbed at low temperatures by an adsorber and then the adsorbed component is desorbed from the adsorber by purging with nitrogen at higher temperatures, wherein, prior to combustion, an $H_2$-rich partial stream is diluted with the nitrogen used for purging. The invention further relates to a system for purifying synthesis gases, in particular for ammonia synthesis, having a sour gas scrubber, a temperature-swing adsorption unit, arranged downstream of the sour gas scrubber, a nitrogen feed line leading into the temperature-swing adsorption unit for charging the temperature-swing adsorption unit with the nitrogen required for purging the adsorber, a nitrogen discharge line of the temperature-swing adsorption unit for withdrawing the nitrogen used for purging, a combustion unit for combusting a partial stream of $H_2$-rich, CO-containing synthesis gas stream, and a hydrogen feed line connecting the sour gas scrubber to the combustion unit for conveying a $H_2$-rich partial stream from the sour gas scrubber into the combustion unit, wherein the nitrogen discharge line is connected to the hydrogen feed line for diluting the $H_2$-rich partial stream with nitrogen.

In such a method, a hydrogen-rich partial stream, which, split off from an $H_2$-rich, CO-containing synthesis gas stream in particular is burnt in a combustion turbine to generate electrical energy, wherein furthermore in a temperature-swing adsorption step, components (that can be frozen out) contained in the remainder of the $H_2$-rich, CO-containing synthesis gas stream, for example carbon dioxide, methanol and/or water, are adsorbed at low temperatures by (at least) one adsorber (e.g. consisting of aluminum silicates) and then the adsorbed components are desorbed by at least one adsorber by purging with nitrogen at higher temperatures.

Temperature-swing adsorption is used in order to achieve a higher purity of said synthesis gas stream, wherein said adsorption and regeneration follow one another periodically, i.e. the adsorber is always alternately loaded (cold) and then regenerated (hot). Preferably at least two adsorbers are used, wherein one adsorbs while the other is regenerated. Usually the adsorbers are regenerated with hot nitrogen (in particular at a temperature between 100° C. and 200° C.), which has a comparatively low pressure, which is above the pressure of the fuel gas ($H_2$-rich partial stream). Desorption/regeneration is then brought about by the temperature rise (TSA: temperature-swing adsorption). The pressure plays a subordinate role in regeneration. The necessary nitrogen pressure results finally from plant integration, which requires feeding the nitrogen, after regeneration, into said fuel gas stream for the combustion turbine. The nitrogen feed then contains said components, for example carbon dioxide, methanol and/or water. After this, the nitrogen used for regeneration is used as a rule as stripping medium in the cold regeneration of Rectisol scrubbing (sour gas scrubbing with methanol). No other use of the nitrogen is envisaged, i.e. the nitrogen ends up as a rule in the separated $CO_2$ product.

Downstream of the temperature-swing adsorption, conventionally in the purification of synthesis gas for ammonia synthesis, liquid nitrogen scrubbing (cold box) is provided, by means of which the carbon monoxide is removed from the $H_2$-rich, CO-containing synthesis gas stream, during which, optionally, the $H_2/N_2$ ratio in the synthesis gas stream of 3:1 required for ammonia synthesis can be adjusted by adding nitrogen.

A particular problem with the method described above is that it cannot be used for example when the $CO_2$ has to be obtained with a low nitrogen content, e.g. for uses in "enhanced oil recovery" technology, and therefore the loaded nitrogen must be burnt or further processed in some other way.

Based on this, the present invention is therefore based on the aim of providing a method of the kind stated at the beginning that has simple apparatus and is economically feasible, and is improved with respect to utilization of nitrogen.

This aim is achieved with a method for purifying synthesis gases, as described above, wherein, prior to combustion, an $H_2$-rich partial stream is diluted with the nitrogen used for purging.

According to this, it is envisaged that said $H_2$-rich partial stream is diluted with the nitrogen used for regeneration in temperature-swing adsorption prior to combustion.

The nitrogen used has a comparatively high pressure (preferably in the range from 20 bar to 40 bar, so that in particular the regeneration in temperature-swing adsorption is carried out at an increased pressure. Moreover, with respect to the temperature-swing adsorption, adsorption of said components preferably takes place at a temperature in the range from −70° to usually 45° C. (such comparatively high temperatures may occur e.g. in chemical gas scrubbing (aMDEA)). The desorption, however, preferably takes place at temperatures in the range from 150° C. to 250° C., preferably at 200° C. The heat necessary for this may be provided by the nitrogen used.

As a result, therefore with the solution according to the invention, the provision of an additional low-pressure nitrogen stream for regeneration of the adsorber in temperature-swing adsorption is unnecessary.

According to one embodiment of the invention, the nitrogen used in the temperature-swing adsorption step is provided by cryogenic separation of air into nitrogen and oxygen. In this, for example atmospheric air can be compressed to a pressure from 5 bar to 10 bar, and liquefied. The liquefied air is separated into oxygen and nitrogen in one or more towers or columns.

For producing the synthesis gas stream, preferably, firstly, a crude gas stream containing carbon monoxide and hydrogen (and other components) is produced by gasification of carbon by means of partial oxidation with oxygen. The oxygen required for this is preferably produced in the air separation described above together with the nitrogen required for purging and dilution.

According to another aspect of the invention, furthermore, carbon monoxide contained in the crude gas stream is converted after the gasification by a water-gas shift reaction with $H_2O$ to hydrogen and carbon dioxide (in the presence of suitable catalysts).

According to another aspect of the invention, after the water-gas shift reaction and before said temperature-swing adsorption, sour gas contained in the crude gas stream, in particular $CO_2$, $H_2S$ and/or COS, is removed by sour gas scrubbing, wherein in particular the sour gas is absorbed by a detergent. The detergent laden with sour gases may then be regenerated and used again for sour gas scrubbing. Methanol is preferably used as the detergent, and the sour gas scrubbing is preferably represented by so-called Rectisol scrubbing, in which the $CO_2$ and the sulfur-containing components are removed in separate fractions.

Then the synthesis gas stream thus obtained, purified of sour gases, is, as described above, purified of other contaminants by means of temperature-swing adsorption (see above) and a (hydrogen-rich) partial stream of the $H_2$-rich, (still) CO-containing synthesis gas stream thus produced is burnt in a combustion unit, in particular in the form of a combustion turbine, wherein heat energy is transformed into mechanical energy, which in particular is converted to electrical energy.

According to another aspect of the invention, the remaining $H_2$-rich, CO-containing synthesis gas stream is sent, after temperature-swing adsorption, to liquid nitrogen scrubbing for further purification, in particular for removing carbon monoxide, and in particular for removing methane and any noble gases present. The liquid nitrogen scrubbing is preferably carried out at a temperature in the range from $-185°$ C. to $-193°$ C. and a pressure in the range from 30 bar to 80 bar, and indeed preferably in a column that is arranged in a cold box, wherein the synthesis gas stream to be purified meets a liquid nitrogen stream in countercurrent. The hydrogen concentration of the finished synthesis gas product is preferably approx. 78 vol % and the residual CO content is in particular less than 1 ppmv.

After leaving the cold box, $N_2$ may be added to the $H_2$-rich, CO-depleted synthesis gas stream, in order for example to adjust the $H_2/N_2$ ratio to 3:1 required for ammonia synthesis. According to another aspect of the invention, the resultant synthesis gas stream may also be converted to ammonia in ammonia synthesis.

Moreover, the problem according to the invention is solved with a system for purifying a synthesis gas, in particular for ammonia synthesis, with the features described above, wherein the system is preferably used for carrying out the method according to the invention, described above.

According to this, it is envisaged that the system has a sour gas scrubber, which is configured for scrubbing a sour gas, in particular in the form of $CO_2$, $H_2S$ and/or COS, from a crude gas stream containing hydrogen and carbon monoxide, wherein, in sour gas scrubbing, preferably an organic solvent (typically methanol) is used at low temperatures, and wherein preferably $CO_2$ and sulfur components are removed in separate fractions, and indeed with formation of a $CO_2$ product and an $H_2S$/COS-rich fraction (e.g. so-called Rectisol scrubbing). Moreover, the system has a temperature-swing adsorption unit arranged downstream of the sour gas scrubber, which is configured, for producing an $H_2$-rich, CO-containing synthesis gas stream, to separate at least one component, in particular carbon dioxide and methanol or carbon dioxide and water, from said crude gas stream by adsorption on an adsorber of the temperature-swing adsorption unit at low temperatures and to regenerate the adsorber by purging with nitrogen at comparatively higher temperatures, wherein the temperature-swing adsorption unit preferably has at least two adsorbers (used in parallel), which cycle through adsorption and regeneration phases alternately, so that essentially a correspondingly purified $H_2$-rich, CO-containing synthesis gas stream can be provided continuously. Furthermore, the system according to the invention has a nitrogen feed line leading into the temperature-swing adsorption unit for supplying the temperature-swing adsorption unit with the nitrogen required for purging the adsorber, a nitrogen discharge line, configured for withdrawing the nitrogen used for purging from the temperature-swing adsorption unit, and a combustion unit, in particular in the form of a combustion turbine (gas turbine), which is configured for burning an $H_2$-rich partial stream from the $H_2$-rich, CO-containing synthesis gas stream for generating energy, and a hydrogen feed line connecting the sour gas scrubber to the combustion unit, which is configured for conveying said $H_2$-rich partial stream from the sour gas scrubber into the combustion unit, wherein according to the invention, the nitrogen discharge line feeds into or is connected to the hydrogen feed line for diluting the $H_2$-rich partial stream with nitrogen prior to combustion of the $H_2$-rich partial stream, i.e. upstream of the combustion unit or turbine.

In a variant of the system according to the invention, an air separation unit is provided, which is configured for separating air cryogenically into nitrogen and oxygen, wherein the air separation unit is connected to the temperature-swing adsorption unit via the nitrogen feed line, so that nitrogen can flow into the temperature-swing adsorption unit for purging the adsorber or the adsorbers of the air separation unit.

Preferably, another nitrogen feed line is provided, which goes into or is connected to the hydrogen feed line, so that additionally nitrogen can be fed from the air separation unit, bypassing the temperature-swing adsorption unit, directly into the hydrogen feed line (upstream of the combustion unit), for directly diluting the $H_2$-rich partial stream with nitrogen prior to combustion of the $H_2$-rich partial stream.

To produce said crude gas stream, according to a variant of the system according to the invention, a gasification reactor is provided, which is configured for gasification of carbon by means of partial oxidation with oxygen, wherein in particular an oxygen feed line is provided, which is configured for conveying the oxygen produced in the air separation unit into the gasification reactor, to meet the demand for oxygen for the partial oxidation. Downstream of the gasification reactor and upstream of the sour gas scrubber, furthermore, preferably a water gas-shift reactor is provided, in which carbon monoxide contained in the crude gas stream is reacted by a water-gas shift reaction with $H_2O$ to hydrogen and carbon dioxide.

According to another variant of the system according to the invention, downstream of the temperature-swing adsorption unit, a liquid nitrogen scrubbing unit is provided, which is configured for scrubbing carbon monoxide out of the $H_2$-rich, CO-containing synthesis gas stream with liquid nitrogen, to produce an $H_2$-rich and correspondingly CO-depleted synthesis gas stream. Removal of carbon monoxide from the synthesis gas is necessary in particular for ammonia synthesis, as carbon monoxide lowers the activity of the catalysts usually employed in ammonia synthesis. Preferably the liquid nitrogen scrubbing unit has a column in a cold box, in which the synthesis gas stream to be purified is introduced in a bottom section of the column, and the liquid nitrogen is supplied to the top of the column. The carbon monoxide and other contaminants (noble gases, methane) can then be withdrawn as nitrogen-containing bottom product, whereas the correspondingly CO-depleted synthesis gas stream is withdrawn at the top of the column.

Further details and advantages of the invention will be explained by the following description of the FIGURE of an embodiment example, based on the FIGURE.

This shows:

FIG. 1 a schematic representation of a system or method for purifying a synthesis gas, in particular for ammonia synthesis.

FIG. 1 shows a schematic representation of a method or a system for purifying a synthesis gas, in particular for ammonia synthesis.

Thus, in a gasification reactor 11, coal 21 is gasified by partial oxidation with oxygen 28, so that a crude gas stream 22 is formed, which among other things contains hydrogen and carbon monoxide. The oxygen required 28 is provided by an air separation unit 17, in which air is separated cryogenically into nitrogen (high pressure) 31 and said oxygen 28.

Carbon monoxide contained in the crude gas stream 22 is reacted in a subsequent water-gas shift reaction in a corresponding water gas-shift reactor 12 with water to hydrogen and carbon dioxide. After this, sour gas, e.g. carbon dioxide 27, hydrogen sulfide and carbonyl sulfide, is removed in a sour gas scrubber 13, wherein the crude gas stream 23 is brought into contact with methanol in countercurrent and the sour gas is absorbed by the methanol. Removal of $CO_2$ and of the sulfur components takes place in separate fractions (Rectisol scrubbing). This results in an $H_2$-rich, (still) CO-containing synthesis gas stream 26a, wherein a part thereof ($H_2$-rich partial stream 26) is led into a combustion unit (combustion turbine) 18, where it is burnt to generate energy.

The remainder of the $H_2$-rich, CO-containing synthesis gas stream 26a has its (freezable) gas components that are still present, such as carbon dioxide, methanol and/or water, removed by temperature-swing adsorption in a temperature-swing adsorption unit 14. The synthesis gas stream 26a flows through an adsorber, in particular containing aluminum silicate, at a temperature of e.g. −50° C. and high pressure, wherein said components are adsorbed on the adsorber. If the adsorber is fully laden, the synthesis gas stream to be purified is switched to another regenerated adsorber and the loaded adsorber is regenerated at comparatively higher temperatures.

For regeneration, the adsorbers are preferably purged with hot nitrogen 33, at higher pressure than the fuel gas (stream 26), out of the air separation unit 17, wherein the nitrogen 35, which is then loaded with carbon dioxide, methanol and/or water, is added to the $H_2$-rich partial stream (fuel gas) 26 for diluting it prior to combustion in the combustion unit 18. Moreover, nitrogen 31 from the separating unit 17 may be used directly for diluting the $H_2$-rich partial stream 26 intended for combustion (is not used previously for regenerating the adsorber).

After the temperature-swing adsorption 14, the purified synthesis gas stream is scrubbed with liquid nitrogen in a liquid nitrogen scrubbing unit 15, to remove carbon monoxide and optionally methane and noble gases. Optionally, the $H_2/N_2$ ratio may also be adjusted by adding nitrogen to the value of 3:1 required for ammonia synthesis 16. Then the $H_2$-rich, CO-depleted and $N_2$-containing synthesis gas stream 24 can be converted in an ammonia synthesis step 16 to ammonia 25.

As a result, the method according to the invention has the advantages, according to which a proportion of the nitrogen for diluting the hydrogen-rich fuel 26 is also used for the temperature-swing adsorption, so that the nitrogen required for the regeneration of the TSA is integrated in the total process, without representing an additional consumption. Furthermore, no additional pressure stage is required for the nitrogen used for dilution. Finally, the laden and contaminated nitrogen from the temperature-swing adsorption does not have to be reprocessed, on account of its use according to the invention as diluent.

LIST OF REFERENCE SYMBOLS

| | |
|---|---|
| 1 | system |
| 11 | gasification reactor |
| 12 | water-gas shift reaction (WGSR) |
| 13 | sour gas scrubber |
| 14 | temperature-swing adsorption unit (TSA) |
| 15 | liquid-nitrogen scrubbing unit |
| 16 | ammonia synthesis |
| 17 | air separation unit |
| 18 | combustion unit |
| 21 | carbon |
| 22 | crude gas stream (CO, $H_2$) |
| 23 | crude gas stream after WGSR |
| 24 | synthesis gas stream ($H_2$) |
| 25 | ammonia |
| 26 | $H_2$-rich partial stream (raw hydrogen) |
| 27 | carbon dioxide |
| 28 | oxygen |
| 29 | electrical energy |
| 31 | nitrogen as diluent |
| 33 | nitrogen as purge gas in TSA |
| 35 | laden nitrogen as diluent |

The invention claimed is:

1. A method for purifying synthesis gas, said method comprising
combusting a partial stream (26) of an $H_2$-rich, CO-containing synthesis gas stream
introducing the remaining $H_2$-rich, CO-containing synthesis gas stream (26a), into an adsorber (14) wherein at least one component contained in the remaining $H_2$-rich, CO-containing synthesis gas stream (26a) is adsorbed at low temperatures and
desorbing said at least one adsorbed component from the adsorber (14) by purging with nitrogen (33) at a temperature higher than the temperature used for adsorption of the at least one component, and at a pressure of 20 to 40 bar,
wherein, prior to combustion, said partial stream (26) of the $H_2$-rich, CO-containing synthesis gas stream is diluted with the nitrogen used for purging (35) said adsorber (14).

2. The method as claimed in claim 1, wherein nitrogen (31), which has not been used previously for purging the adsorber (14), is added to the $H_2$-rich, CO-containing partial stream (26) prior to combustion, to dilute the $H_2$-rich, CO-containing partial stream.

3. The method as claimed in claim 2, wherein the nitrogen (31) used for dilution of the $H_2$-rich, CO-containing partial stream is produced by cryogenic separation (17) of air.

4. The method as claimed in claim 1, said $H_2$-rich, CO-containing synthesis gas stream (26a) is obtained from a crude gas stream containing hydrogen and carbon monoxide (22) produced by gasification of carbon (21) by partial oxidation with oxygen (28).

5. The method as claimed in claim 4, wherein before adsorption of said at least one component in said adsorber (14), sour gas contained in said crude gas stream (23) is washed out (13) by means of a detergent.

6. The method as claimed in claim 5, wherein said sour gas contained in said crude gas stream comprises $CO_2$, $H_2S$ and/or COS.

7. The method as claimed in claim 5, wherein detergent is methanol.

8. The method as claimed in claim 4, wherein said oxygen (28) for said partial oxidation is obtained from separation of air (17).

9. The method as claimed in claim 4, further comprising subjecting said crude gas stream (22) to a water-gas shift reaction (12) wherein carbon monoxide contained in said crude gas stream (22) is reacted with $H_2O$ to produce hydrogen and carbon dioxide.

10. The method as claimed in claim 1, further comprising, after adsorption of said at least one component in said adsorber (14), subjecting the $H_2$-rich, CO-containing synthesis gas stream (26a) to liquid nitrogen scrubbing (15) to remove carbon monoxide and produce an $H_2$-rich, CO-depleted synthesis gas stream (24).

11. The method as claimed in claim 10, further comprising converting the $H_2$-rich, CO-depleted synthesis gas stream (24) to ammonia (25).

12. The method as claimed in claim 10, wherein said liquid nitrogen scrubbing is conducted at a temperature in the range from $-185°$ C. to $-193°$ C. and at a pressure in the range from 30 bar to 80 bar.

13. The method as claimed in claim 1, wherein said at least one component contained in the remaining $H_2$-rich, CO-containing synthesis gas stream (26a) is carbon dioxide, methanol and/or water.

14. The method as claimed in claim 1, wherein said adsorber (14) is a temperature-swing adsorber, and adsorption of said at least one components is conducted at a temperature in the range from $-70°$ to $45°$ C. and desorption is conducted at a temperature in the range from $150°$ C. to $250°$ C.

15. A system for purifying synthesis gas comprising:
a sour gas scrubber (13), which is configured for scrubbing a sour gas from a crude gas stream containing hydrogen and carbon monoxide (23), resulting in an $H_2$-rich, CO-containing synthesis gas stream (26a),
a temperature-swing adsorption unit (14), arranged downstream of the sour gas scrubber (13), and configured for separating at least one component from the $H_2$-rich, CO-containing synthesis gas stream (26a) by adsorption on an adsorber of the temperature-swing adsorption unit (14) at low temperatures and to regenerate the adsorber by purging with nitrogen at higher temperatures and at a pressure of 20 to 40 bar,
a nitrogen feed line (33) leading into the temperature-swing adsorption unit (14) for charging the temperature-swing adsorption unit (14) with the nitrogen required for purging the adsorber,
a nitrogen discharge line (35) of the temperature-swing adsorption unit (14), which is configured for withdrawing the nitrogen used for purging from the temperature-swing adsorption unit (14),
a combustion unit (18) configured for burning an $H_2$-rich partial stream of the $H_2$-rich, CO-containing synthesis gas stream for generating energy, and
a hydrogen feed line (26) connecting the sour gas scrubber (13) to the combustion unit (18), which is configured for conveying said $H_2$-rich partial stream from the sour gas scrubber (13) into the combustion unit (18),
wherein said nitrogen discharge line (35) is connected to the hydrogen feed line (26) for diluting the $H_2$-rich partial stream with nitrogen.

16. The system as claimed in claim 15, wherein an air separation unit (17), which is configured for separating air into nitrogen and oxygen, the air separation unit being connected via the nitrogen feed line (33) to the temperature-swing adsorption unit (14), in order to convey nitrogen for purging the adsorber from the air separation unit (17) to the temperature-swing adsorption unit (14).

17. The system as claimed in claim 16, wherein another nitrogen feed line (31) is provided, which is connected to the hydrogen feed line (26), so that nitrogen can be fed from the air separation unit (17), bypassing the temperature-swing adsorption unit (14), into the hydrogen feed line (26), to dilute the $H_2$-rich partial stream with nitrogen.

18. The system as claimed in claim 15, wherein a gasification reactor (11) is provided, which is configured, for producing said crude gas stream (22), to gasify carbon by means of partial oxidation with oxygen, and an oxygen feed line (28) is provided, which is configured for conveying the oxygen produced in the air separation unit (17) into the gasification reactor (11), and downstream of the gasification reactor (11) and downstream of the sour gas scrubber (12), a water gas-shift reactor (12) is provided, which is configured for reacting carbon monoxide contained in the crude gas stream (22) by a water-gas shift reaction with $H_2O$ to hydrogen and carbon dioxide.

19. The system as claimed in claim 15, wherein downstream of the temperature-swing adsorption unit (14), a liquid nitrogen scrubbing unit (15) is provided, which is configured for washing out carbon monoxide from the $H_2$-rich, CO-containing synthesis gas stream with liquid nitrogen for producing an $H_2$-rich and correspondingly CO-depleted synthesis gas stream (24).

* * * * *